(12) United States Patent
Nagao et al.

(10) Patent No.: US 12,299,333 B2
(45) Date of Patent: May 13, 2025

(54) IMAGE FORMING SYSTEM, METHOD FOR CONTROLLING THE SAME, AND STORAGE MEDIUM

(71) Applicant: CANON KABUSHIKI KAISHA, Tokyo (JP)

(72) Inventors: Daisuke Nagao, Saitama (JP); Yurino Kojima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/428,554

(22) Filed: Jan. 31, 2024

(65) Prior Publication Data

US 2024/0168685 A1 May 23, 2024

Related U.S. Application Data

(63) Continuation of application No. 18/061,394, filed on Dec. 2, 2022, now Pat. No. 11,922,077.

(30) Foreign Application Priority Data

Dec. 7, 2021 (JP) ................................. 2021-198281

(51) Int. Cl.
*G06F 3/12* (2006.01)
*G06K 15/02* (2006.01)

(52) U.S. Cl.
CPC .......... *G06F 3/1208* (2013.01); *G06F 3/1253* (2013.01); *G06K 15/1836* (2013.01); *G06F 3/12* (2013.01); *G06F 3/1204* (2013.01)

(58) Field of Classification Search
USPC .......................................................... 358/1.9
See application file for complete search history.

(56) References Cited

U.S. PATENT DOCUMENTS

| 5,941,671 | A | * | 8/1999 | Wehrle | ...................... B42C 9/00 412/8 |
| 2001/0016646 | A1 | * | 8/2001 | Rueger | ................... A61L 27/44 435/810 |
| 2007/0171455 | A1 | * | 7/2007 | Tominaga | ............. G06F 3/1282 358/1.14 |
| 2007/0201071 | A1 | * | 8/2007 | Yamada | ............. H04N 1/00413 358/1.13 |
| 2021/0170483 | A1 | * | 6/2021 | Hudelson | ................ B22F 10/64 |

* cited by examiner

*Primary Examiner* — Darryl V Dottin
(74) *Attorney, Agent, or Firm* — Canon U.S.A., Inc. IP Division

(57) ABSTRACT

An image forming system includes an image forming unit configured to form a print image to be printed on a recording medium, based on a raster image and print setting information, a printing unit configured to print an image on the recording medium based on the print image, an image reading unit configured to read the image printed on the recording medium to obtain a read image, and a determination unit configured to determine whether there is an error in the image printed on the recording medium, based on the read image and the raster image. In a case where there is a predetermined difference between the raster image and the read image and the predetermined difference is based on the print setting information, the determination unit does not determine that there is an error in the printed image.

10 Claims, 11 Drawing Sheets

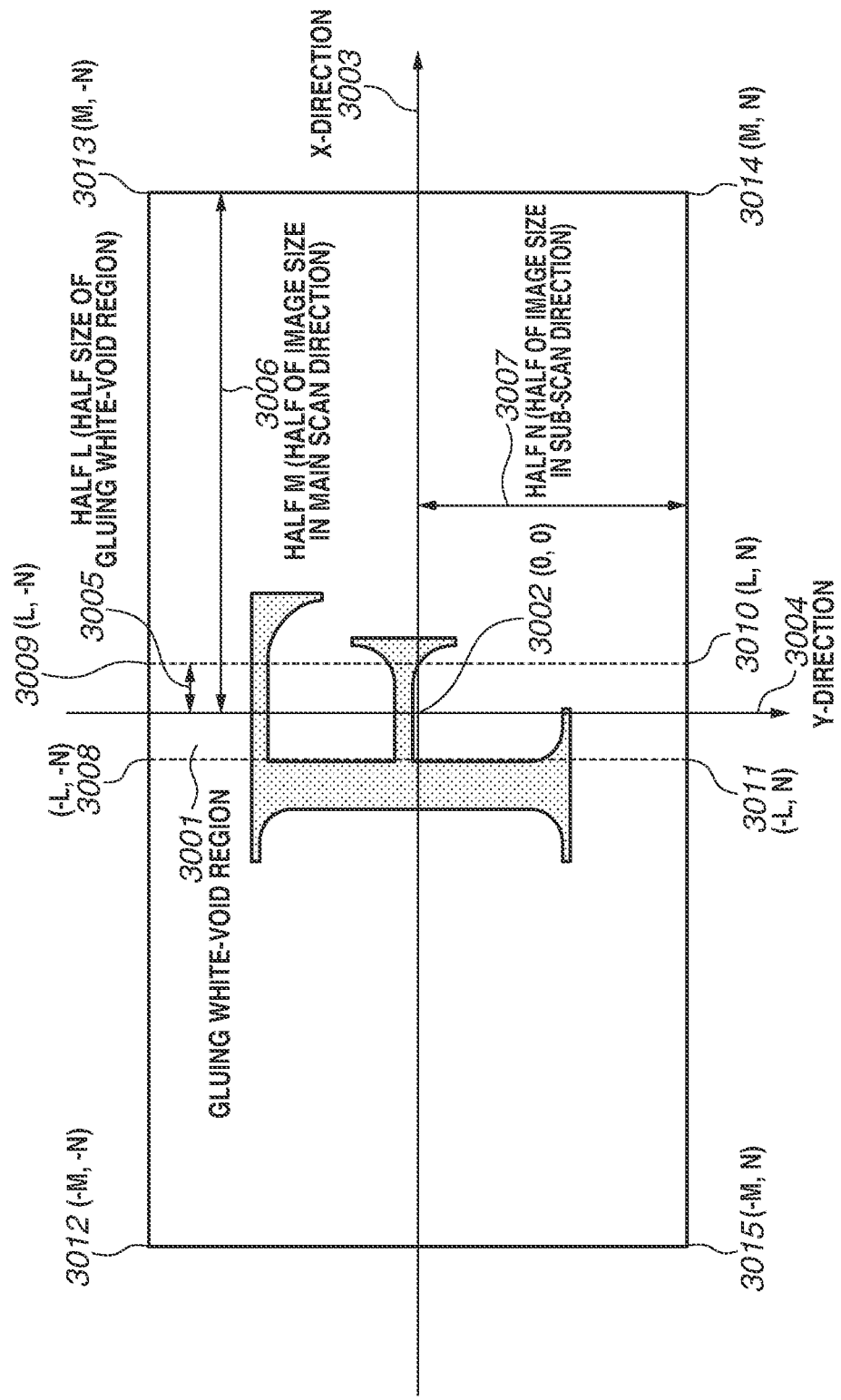

IMAGE FORMING SYSTEM, METHOD FOR CONTROLLING THE SAME, AND STORAGE MEDIUM

CROSS-REFERENCE TO RELATED APPLICATIONS

This application is a Continuation of U.S. patent application Ser. No. 18/061,394, filed Dec. 2, 2022, which claims the benefit of Japanese Patent Application No. 2021-198281, filed Dec. 7, 2021, both of which are hereby incorporated by reference herein in their entirety.

BACKGROUND OF THE INVENTION

Field of the Invention

The present invention relates to an image forming system, a method for controlling the image forming system, and a storage medium.

Description of the Related Art

In an image forming apparatus such as a multifunction peripheral (MFP), an image forming unit that performs image formation using an electrophotographic method forms a toner image on an image bearing member such as a photosensitive member based on image information and transfers the formed toner image onto a sheet. During the image formation, a state of the image forming unit may change depending on an operation state of the image forming apparatus, and this may cause a change in image quality. Thus, Japanese Patent Application Laid-Open No. 2016-180856 discusses a technique of inspecting finished quality of a printed material by comparing an image that is input to an image forming unit and a read image that is obtained by reading an image formed on a sheet by the image forming unit in order to maintain the quality of the printed material.

The technique discussed in Japanese Patent Application Laid-Open No. 2016-180856 inspects the finished quality of a printed material by comparing a raster image that is obtained as a result of raster image processor (RIP) processing and a read image that is obtained by reading an image formed on a sheet. In a case where image processing is performed according to internal processing of the image forming apparatus after the RIP processing, a difference may occur between the raster image and the read image, and this may cause an issue where the finished quality of the printed material is unable to be inspected properly.

SUMMARY OF THE INVENTION

The present invention is directed to a system capable of inspecting finished quality of a printed material properly.

The present invention is further directed to a system capable of inspecting finished quality of a printed material properly even in a case where a difference occurs between a printing target raster image and an image printed on a recording medium.

According to an aspect of the present invention, an image forming system includes an image forming unit configured to form a print image to be printed on a recording medium, based on a raster image and print setting information, a printing unit configured to print an image on the recording medium based on the print image formed by the image forming unit, an image reading unit configured to read the image printed on the recording medium by the printing unit to obtain a read image, and a determination unit configured to determine whether there is an error in the image printed on the recording medium, based on the read image obtained by the image reading unit and the raster image. In a case where there is a predetermined difference between the raster image and the read image and the predetermined difference is based on the print setting information, the determination unit does not determine that there is an error in the printed image.

Further features of the present invention will become apparent from the following description of exemplary embodiments with reference to the attached drawings.

BRIEF DESCRIPTION OF THE DRAWINGS

FIG. 3 is a diagram illustrating a gluing white-void region in perfect binding according to the first exemplary embodiment of the present invention.

DESCRIPTION OF THE EMBODIMENTS

Exemplary embodiments of the present invention will be described in detail below with reference to the attached drawings. The below-described exemplary embodiments are not intended to limit the scope of the claimed invention and not all combinations of features described in the exemplary embodiments are essential to a technical solution of the present invention. Each of the embodiments of the present invention described below can be implemented solely or as a combination of a plurality of the embodiments or features thereof where necessary or where the combination of elements or features from individual embodiments in a single embodiment is beneficial.

An image forming apparatus 1000 according to a first exemplary embodiment of the present invention will be described with reference to FIGS. 1 to 6.

Figure 1:
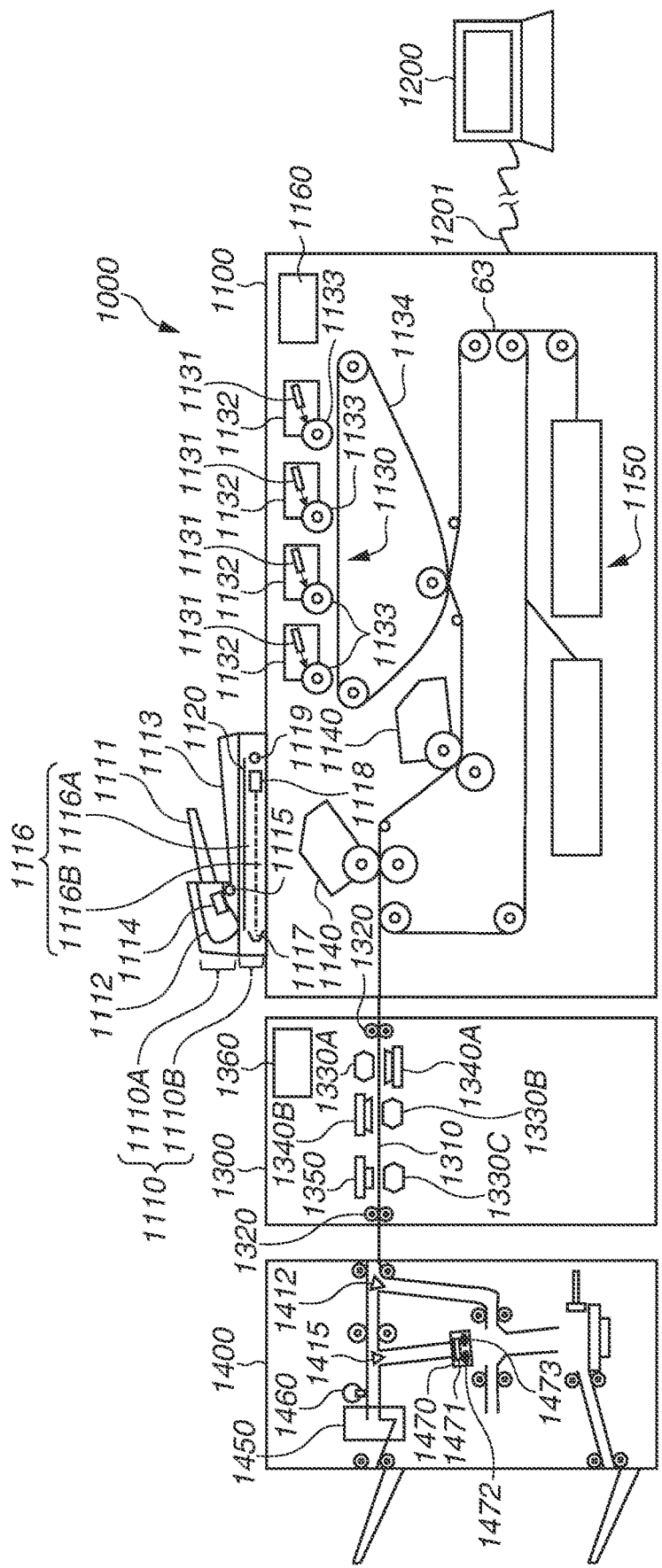
FIG. 1 is a diagram illustrating an example of an entire configuration of an image forming system including an image forming apparatus according to a first exemplary embodiment of the present invention.

FIG. 1 illustrates an example of an entire configuration of an image forming system including the image forming apparatus 1000 according to the present exemplary embodiment. As illustrated in FIG. 1, the image forming apparatus 1000 includes an image forming apparatus body 1100, an image reading apparatus 1300, a binding apparatus (or glue binding apparatus) 1400. A client personal computer (client PC) 1200, which is an example of a terminal apparatus, is connected to the image forming apparatus body 1100 via a communication line 1201 such as a network. The client PC 1200 transmits print data to the image forming apparatus body 1100. The image forming apparatus body 1100 receives the print data transmitted from the client PC 1200 via the communication line 1201 and performs printing based on the received print data. The binding apparatus 1400 performs binding processing on sheets on which images are formed. A reading unit 1110 is provided at the top of the image forming apparatus body 1100. The reading unit 1110 includes an auto-document feeder (ADF) 1110A and a document reading unit 1110B. The ADF 1110A includes a document tray 1111, a sheet passing path 1112, a sheet discharge tray 1113, a contact image sensor 1114, and a density reference member 1115. The density reference member 1115 is used in shading correction by the ADF 1110A. The document reading unit 1110B includes a document illumination unit 1116, a reflection mirror 1117, a condenser lens 1118, a sensor 1119, and a platen glass 1120. The reading unit 1110 separates and feeds sheets of a document placed on the document tray 1111 one by one, conveys the fed document in a sub-scan direction along the sheet passing path 1112 where the contact image sensor 1114 is disposed, and discharges the conveyed document to the sheet discharge tray 1113. The document illumination unit 1116 includes a lamp 1116A and a mirror 1116B. While the document is conveyed in the sub-scan direction along the sheet passing path 1112, a reading operation is repeatedly performed in a main scan direction on a line-by-line basis by the document illumination unit 1116, the reflection mirror 1117, the condenser lens 1118, and the sensor 1119.

The image forming apparatus body 1100 includes a controller 1160, an image forming unit 1130, a fixing unit 1140, and a sheet feeding unit 1150. The controller 1160 performs image processing on document image data acquired from the client PC 1200 to generate a print image (an image for printing), and transmits the generated print image to the image forming unit 1130. Details thereof will be described below. The controller 1160 controls the image forming unit 1130, the fixing unit 1140, and the sheet feeding unit 1150. The image forming unit 1130 includes exposure devices 1131, development devices 1132, photosensitive drums 1133, and a transfer belt 1134. The image forming unit 1130 supplies toners of different colors to the respective photosensitive drums 1133 to develop toner images thereon based on the print image data received from the controller 1160 or the document image data read by the reading unit 1110, using the exposure devices 1131 and the development devices 1132. The image forming unit 1130 transfers the toner images developed on the photosensitive drums 1133 onto a sheet fed by the sheet feeding unit 1150, using the transfer belt 1134. Then, the fixing unit 1140 melts the toners of the toner images transferred to the sheet, whereby a color image is fixed to the sheet. The image reading apparatus 1300 is disposed on a rear stage side of the image forming apparatus body 1100 using an in-line method and reads a printed image on one or each side of the sheet subjected to the image formation. While the image reading apparatus 1300 disposed using the in-line method is described below, the image reading apparatus 1300 can be disposed at the rear stage side of the image forming apparatus body 1100 using an off-line method.

The image reading apparatus 1300 includes a controller 1360, image reading units 1340A and 1340B, a colorimeter 1350, background members 1330A to 1330C, a conveyance unit 1320, and a conveyance path 1310. The controller 1360 transmits read images acquired from the image reading units 1340A and 1340B to the controller 1160. Details thereof will be described below. The controller 1360 controls the conveyance unit 1320, the background members 1330A to 1330C, the image reading units 1340A and 1340B, and the colorimeter 1350. The conveyance path 1310 is a path through which a sheet passes. The conveyance unit 1320 conveys a sheet with an image formed thereon. Thus, driving the conveyance unit 1320 causes the sheet to be conveyed through the conveyance path 1310. In a case where, for example, the image reading apparatus 1300 receives a sheet fed from the image forming apparatus body 1100, the image reading units 1340A and 1340B and the colorimeter 1350 read an image formed on the received sheet. A result of reading the image (hereinafter referred to as a "read image") can be output to the image forming apparatus body 1100. More specifically, each of the image reading units 1340A and 1340B is disposed at a position facing a corresponding one of the front and back sides of the sheet passing through the conveyance path 1310. The image reading unit 1340A is disposed at the position for reading the image on the back side of the sheet. A result of the reading by the image reading unit 1340A can be used to check, for example, whether there is a misalignment between the images printed on the front and back sides of the sheet or whether there is an unintended image. On the other hand, the image reading unit 1340B is disposed at the position for reading the image on the front side of the sheet. More specifically, the image reading unit 1340B reads the image printed on the sheet. While the sheet is conveyed, the image reading unit 1340B reads colors of the image formed on the sheet along a direction perpendicular to a moving direction of the sheet, i.e., along the main scan direction. The image reading units 1340A and 1340B may be collectively referred to as the "image reading unit 1340". The image reading unit 1340 includes, for example, a scanner. The background members 1330A to 1330C may be collectively referred to as the "background member 1330".

Figure 2A:
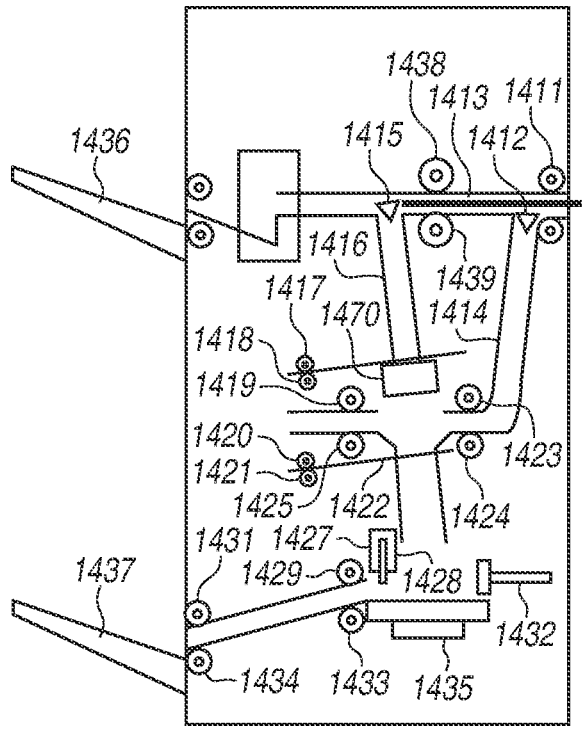
FIGS. 2A to 2G are diagrams illustrating an example of a configuration of a binding apparatus according to the first exemplary embodiment of the present invention.
Figure 2B:
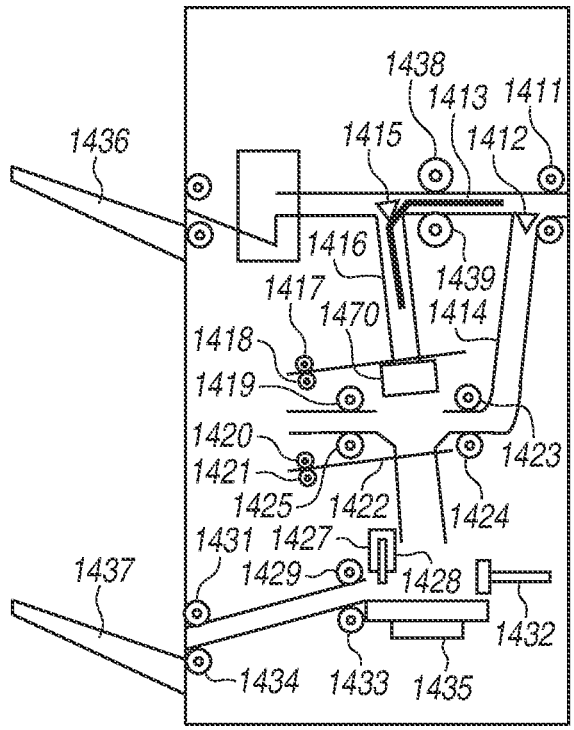

The binding apparatus 1400 receives a sheet output from the conveyance unit 1320 and performs various types of processing on the sheet by changing the moving direction of the sheet based on processing details. In a case where a punching function is enabled, direction changing members 1412 and 1415 are controlled to guide the sheet to a punching unit 1460 so that the punching unit 1460 punches the sheet. Similarly, in a case where a stapling function is enabled, the direction changing members 1412 and 1415 are controlled so that a stapling unit 1450 staples the sheet. The stapling unit 1450 staples the sheet depending on the type of stapling selected. In a case where glue binding is selected, the direction changing members 1412 and 1415 are controlled so that glue binding is performed. First, operations of perfect binding including gluing a cover sheet will be described with reference to FIGS. 2A to 2G. In FIGS. 2A and 2B, each bold line indicates a single content sheet to clarify the position of the sheet. On the other hand, in FIGS. 2C and 2D, each bold line indicates a bundle of content sheets.

Figure 2C:
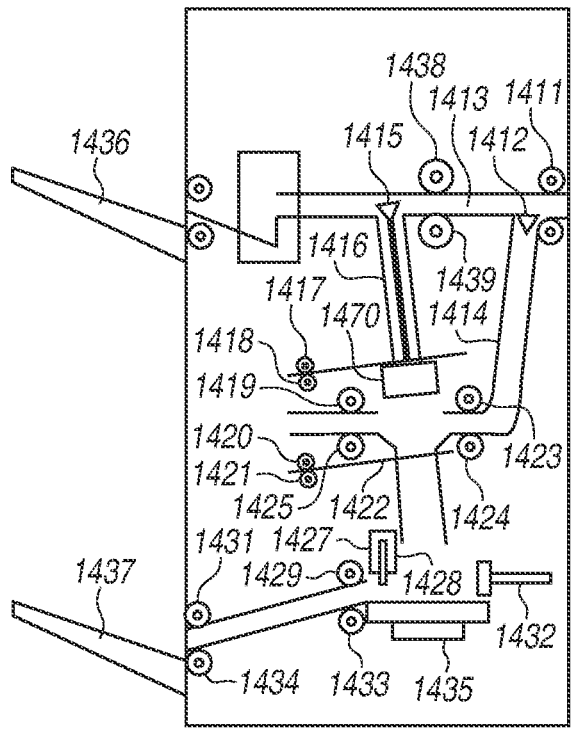
Figure 2D:
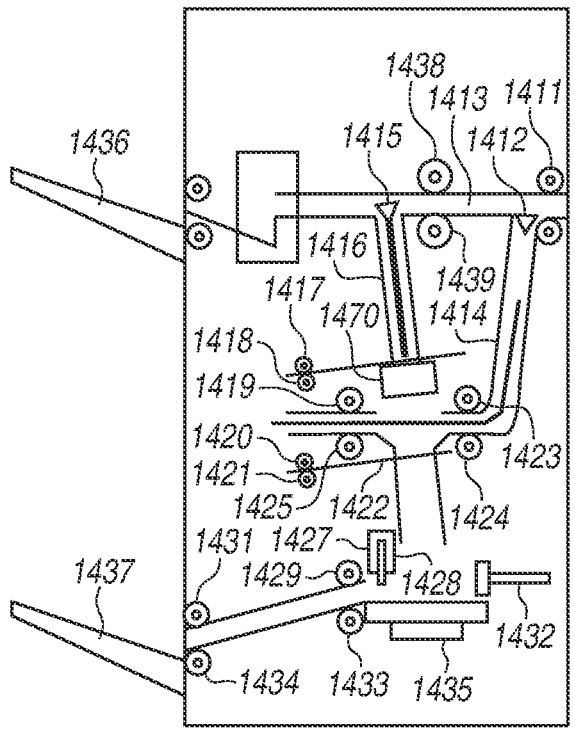

As illustrated in FIG. 2A, the direction changing member 1412 changes the direction thereof to guide the sheet to a transfer sheet path 1413, and rollers 1438 and 1439 convey the sheet. Then, as illustrated in FIG. 2B, the direction changing member 1415 changes the direction thereof to guide the sheet to a stacking portion 1416. Similarly, as illustrated in FIG. 2C, all the content sheets for perfect binding are stored in the stacking portion 1416. Then, as illustrated in FIG. 2D, a cover sheet for perfect binding is conveyed. The direction changing member 1412 changes the direction thereof to guide the cover sheet to a cover sheet path 1414.

Figure 2E:
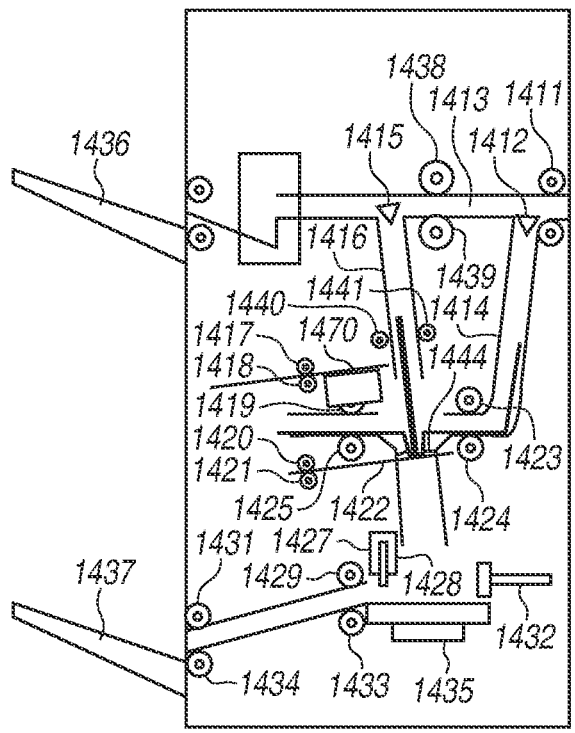
Figure 2F:
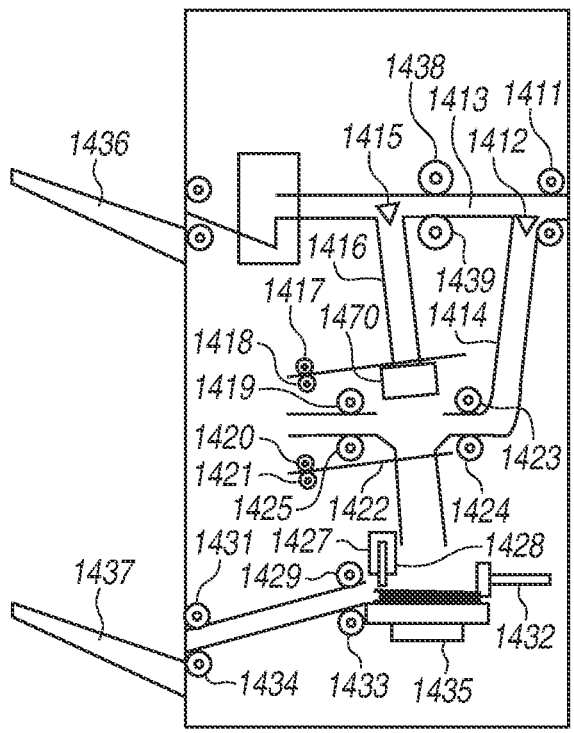
Figure 2G:
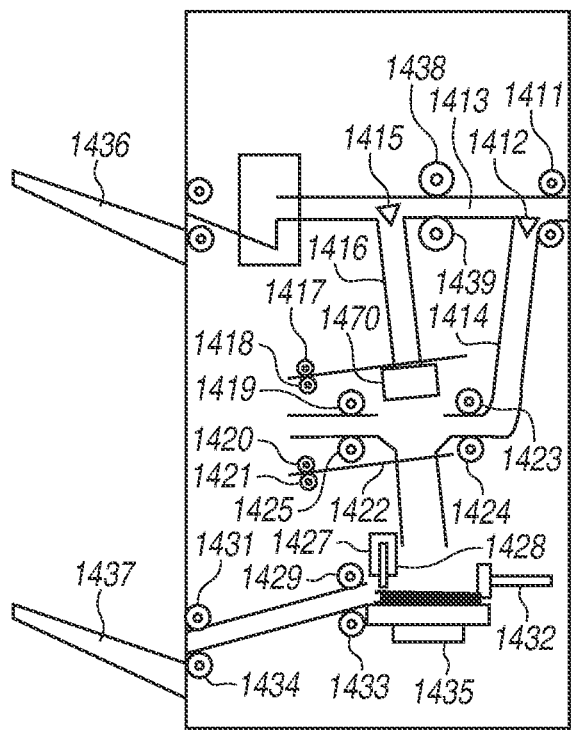

Rollers 1423 and 1419 are rotated so that the middle of the cover sheet is positioned at the middle of the space between the rollers 1423 and 1419. At this time, a gluing unit 1470 is moved from the front to the back to glue the content sheets. The gluing unit 1470 includes a glue portion 1471, a heater portion 1472, and a sensor portion 1473 (refer to FIG. 1). The heater portion 1472 heats a solid glue to a predetermined temperature to enable the gluing. At this time, the sensor portion 1473 detects the glue temperature to control the glue temperature not to reach a preset temperature. Then, the glued content sheets are glued to the cover sheet. As illustrated in FIG. 2E, the gluing unit 1470 is retracted to a predetermined position by rotation of rollers 1417 and 1418, and rollers 1440 and 1441 rotate to move the content sheets downward. After the content sheets reach the cover sheet, the rollers 1440 and 1441 stop rotating. This state is kept for a predetermined period of time. The gluing is performed in this manner. At this time, a folding member 1444 operates to fold the cover sheet. Then, as illustrated in FIG. 2F, a member 1422 at the gluing position moves to guide edges of the glued bound sheets to a trimming position for trimming the edges in order to align the edges. At this time, members 1420 and 1421 move to lay down the glued bound sheets. As illustrated in FIG. 2G, a position control member 1432 moves to control the position on a trimmer turntable 1435. The edges of the bound sheets placed on the trimmer turntable 1435 are trimmed by a cutter 1428 protruding from a trimmer unit 1427 and moving upward and downward. The trimmer turntable 1435 is turned by 90 degrees and 180 degrees to trim the edges on three sides of the sheets. The position control member 1432 moves toward a tray 1437, and rollers 1429, 1433, 1431, and 1434 rotate, whereby the trimmed bound sheets are discharged to the tray 1437. Next, a region to be glued to a back cover sheet in perfect binding will be described with reference to FIG. 3. No images are to be formed on a gluing region (hereinafter referred to as a "gluing white-void region") 3001 of a sheet in order to increase the gluing strength. Thus, image processing for whitening the gluing white-void region 3001 is performed on the print data received from the client PC 1200. In the present exemplary embodiment, coordinates (0, 0) 3002 are central coordinates of a raster image (described below), an X-direction 3003 is a horizontal direction, and a Y-direction 3004 is a vertical direction.

Figure 4:
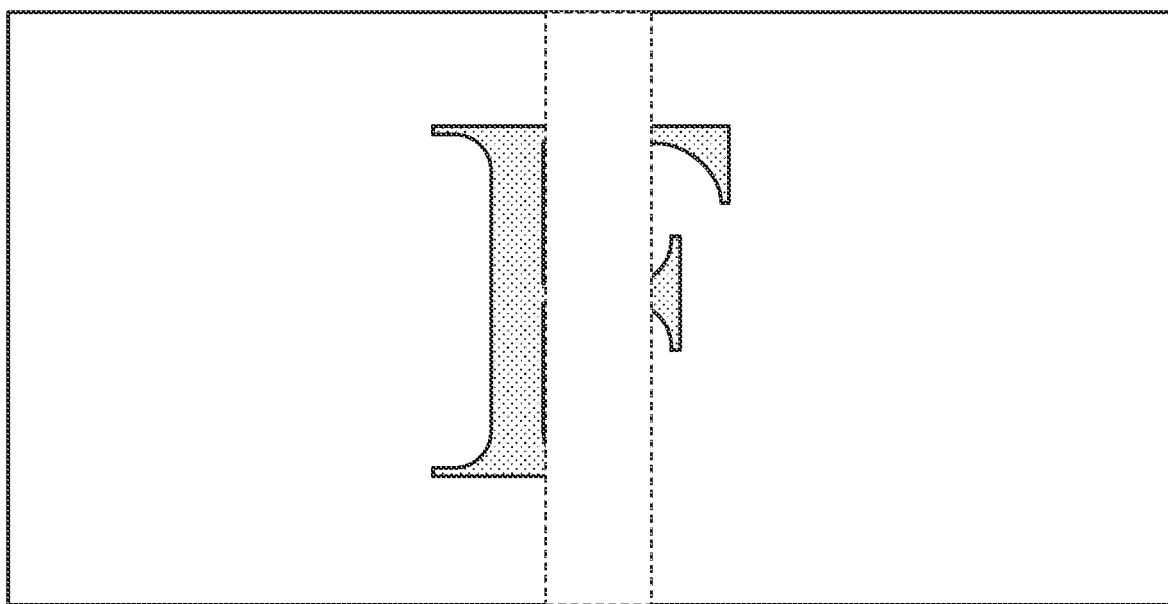
FIG. 4 is a diagram illustrating an image where the gluing white-void region in the perfect binding is whitened according to the first exemplary embodiment of the present invention.

Further, a half L 3005 is a half size of the gluing white-void region 3001 in the X-direction 3003, a half M 3006 is a half of the image size in the X-direction 3003, and a half N 3007 is a half of the image size in the Y-direction 3004. Further, coordinates of four corners of the gluing white-void region 3001 are coordinates (−L, −N) 3008, (L, −N) 3009, (L, N) 3010, and (−L, N) 3011 in order from the upper left in the clockwise direction. Further, coordinates of four corners of the image are coordinates (−M, −N) 3012, (M, −N) 3013, (M, N) 3014, and (−M, N) 3015 in order from the upper left in the clockwise direction. While pixels are used as an example of units in the X-direction 3003 and the Y-direction 3004, distances can be used as units. The half L 3005 can be set based on a maximum region that can be glued, or can be calculated dynamically based on the bundle size of the content sheets. FIG. 4 illustrates an example of an image obtained as a result of the image processing for whitening the gluing white-void region 3001.

Figure 5:
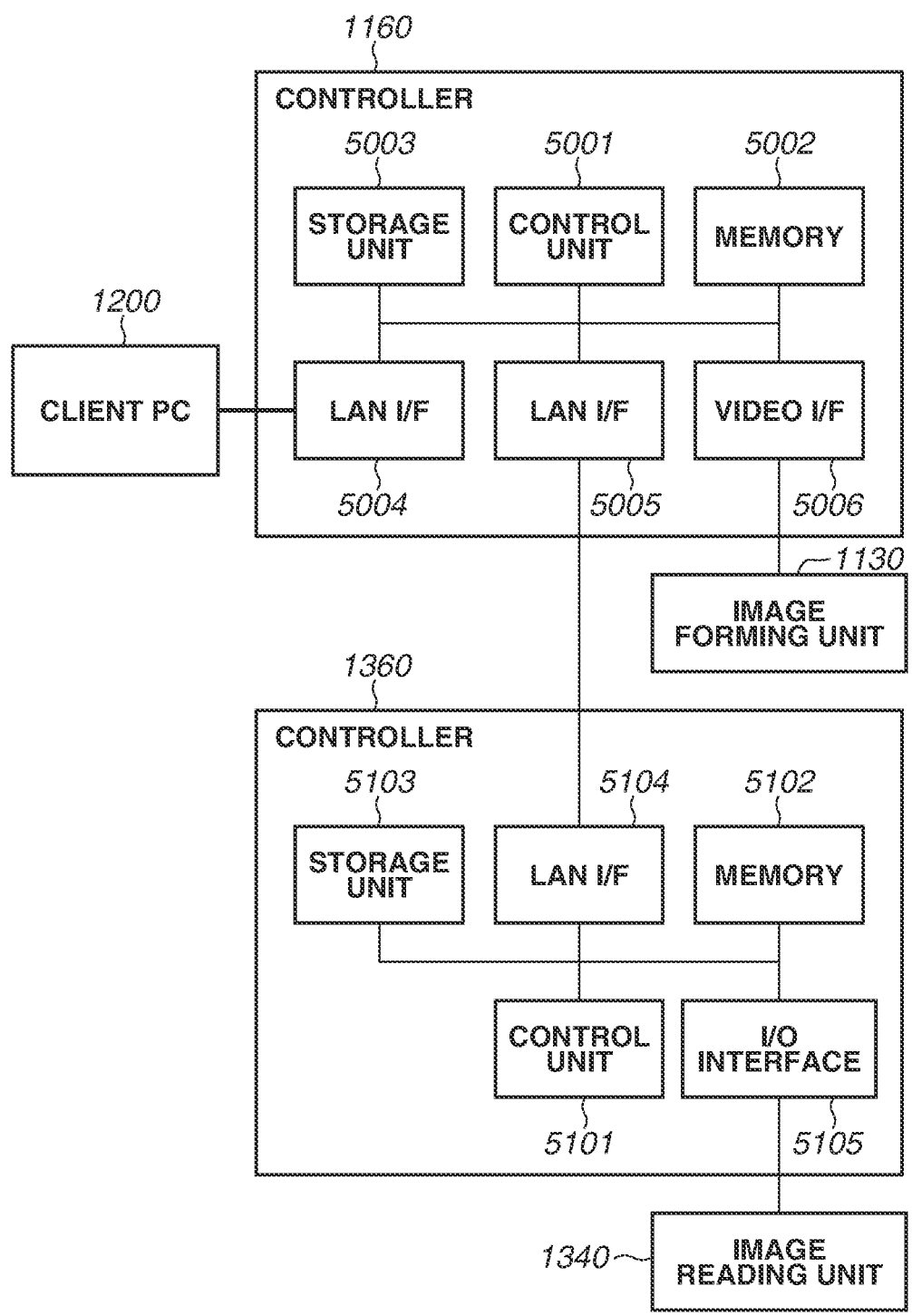
FIG. 5 is a block diagram illustrating a flow of various types of data according to the first exemplary embodiment of the present invention.

Next, control for inspecting finished product of a printed material will be described with reference to FIG. 5. A case where perfect binding, in which internal processing of the image forming apparatus body 1100 is performed, is performed will be described as an example.

The controller 1160 of the image forming apparatus body 1100 includes a control unit 5001, such as a central processing unit (CPU), and a memory 5002, such as a read-only memory (ROM) or a random access memory (RAM). The image forming apparatus body 1100 further includes a storage unit 5003, such as a hard disk drive (HDD), local area network (LAN) interfaces (I/Fs) 5004 and 5005 as communication interfaces, and a video I/F 5006. The video I/F 5006 passes image data to the image forming unit 1130. The control unit 5001 reads a program corresponding to processing details from the memory 5002, executes the read program, and controls operations of the image forming apparatus body 1100. Various types of data stored in the storage unit 5003 are referred to when the control unit 5001 controls the operations of the image forming apparatus body 1100.

The LAN I/F 5004 is a communication interface for receiving print data from the client PC 1200. The print data includes as a data structure, for example, a print job language (PJL) portion and a page description language (PDL) portion following the PJL portion. The PJL portion is a print command language for controlling the image forming apparatus body 1100. The PDL portion is a page description language. Further, the LAN I/F 5005 is a communication interface for receiving images from the image reading apparatus 1300.

The control unit 5001 performs screen processing, i.e., raster image processing (dotting processing) on the print data generated by the client PC 1200 so that the print data can be printed by the image forming apparatus body 1100. The raster image processing, i.e., raster image processor (RIP) processing is performed to generate a raster image. The raster image is rasterized image data and forms an RIP image. The generated raster image is stored in the storage unit 5003. Further, when printing is performed, the control unit 5001 reads the raster image stored in the storage unit 5003 and performs image correction to the read image. In the case of perfect binding, the control unit 5001 performs the image processing for whitening the gluing white-void region 3001 to generate a print image (an image for printing), and stores the generated print image in the storage unit 5003. The control unit 5001 transmits the print image as a video signal to the image forming unit 1130, so that the image forming unit 1130 forms an image on a sheet.

The image formed on the sheet is read by the image reading apparatus 1300. The controller 1360 of the image reading apparatus 1300 includes a control unit 5101, such as a CPU, and a memory 5102, such as a ROM or a RAM. The controller 1360 further includes a storage unit 5103, such as a HDD, a LAN I/F 5104 as a communication interface, and an input/output (I/O) interface 5105. The I/O interface 5105 acquires read image data obtained by the image reading unit 1340. The control unit 5101 reads a program corresponding to processing details from the memory 5102, executes the read program, and controls operations of the image reading apparatus 1300. Various types of data stored in the storage unit 5103 are referred to when the control unit 5101, which is an example of a control unit, controls the operations of the image reading apparatus 1300.

The read image is transmitted to the controller 1160 via the control unit 5101 and the LAN I/F 5104. After receiving the read image, the control unit 5001 of the controller 1160 inspects the finished quality of the printed material by comparing the read image and the raster image and determining whether there is an error in the printed material. Details thereof will be described below.

Figure 6:
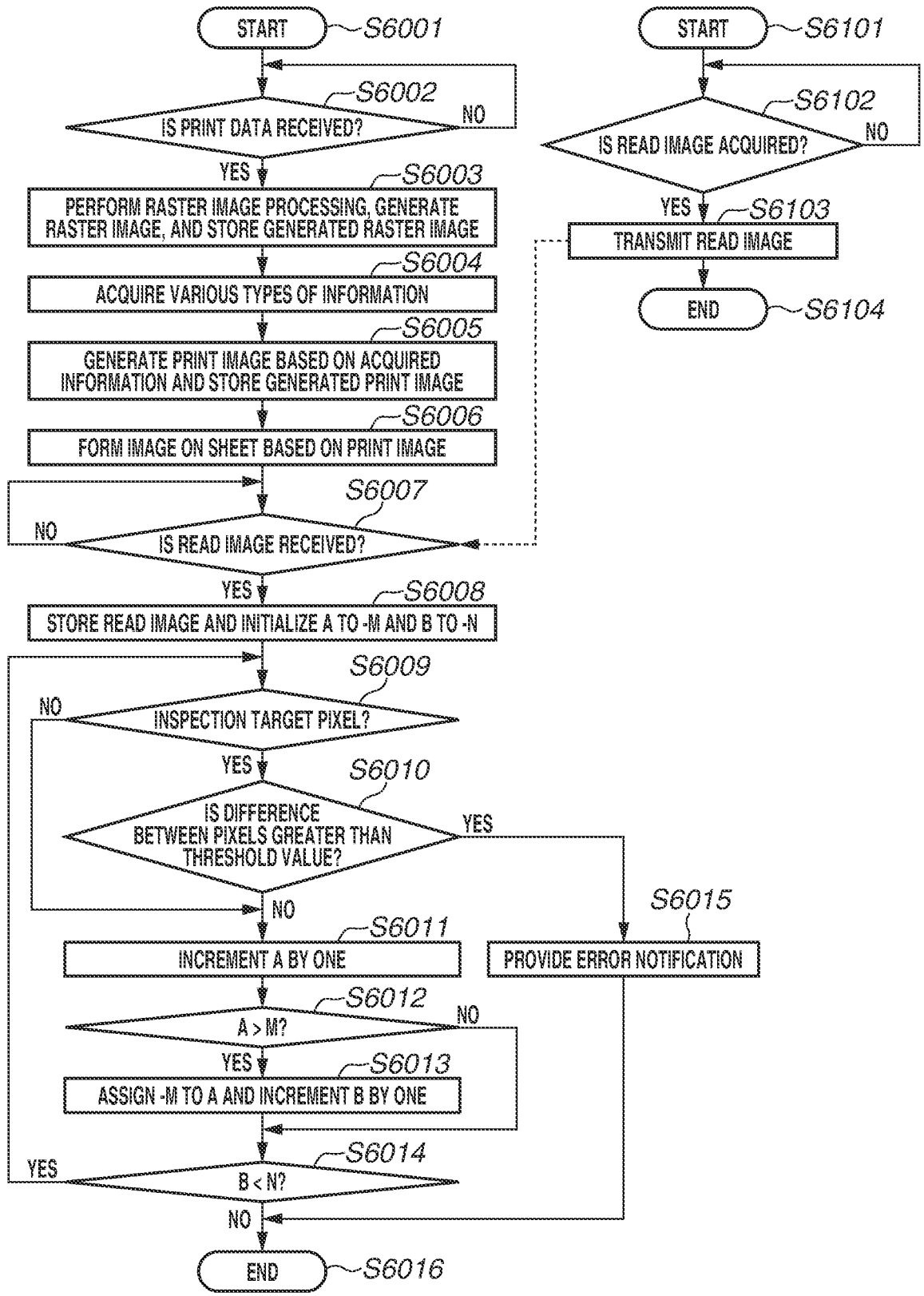
FIG. 6 is a flowchart illustrating a control procedure according to the first exemplary embodiment of the present invention.

Next, a processing procedure for inspecting the finished quality of a printed material according to the present exemplary embodiment will be described with reference to a flowchart in FIG. 6. In the present exemplary embodiment, a case where perfect binding is selected will be described as an example. Processing in steps S6001 to S6016 in the flowchart is implemented by the control unit 5001, such as a CPU, reading a program stored in the memory 5002 and executing the read program. Processing in steps S6101 to S6104 in the flowchart is implemented by the control unit 5101, such as a CPU, reading a program stored in the memory 5102 and executing the read program.

In step S6001, the control unit 5001 starts the processing. For example, in a case where power is turned on, the processing proceeds to step S6001. In step S6002, in a case where the control unit 5001 determines that print data is received from the client PC 1200 (YES in step S6002), the processing proceeds to step S6003. In a case where the control unit 5001 determines that print data is not received from the client PC 1200 (NO in step S6002), the processing in step S6002 is repeated.

In step S6003, the control unit 5001 performs raster image processing on the received print data to generate a raster image, and stores the generated raster image in the storage unit 5003. For example, print data such as PDL data is rasterized through a display list to generate a raster image. At this point, image processing based on settings including a glue binding setting is not performed on the raster image.

In step S6004, the control unit 5001 acquires print setting information based on which further image processing is to be performed on the raster image, and information about the image forming apparatus body 1100. In the present exemplary embodiment, the control unit 5001 acquires information indicating a perfect binding setting and gluing whitevoid region size information L3001.

In step S6005, the control unit 5001 performs image processing on the raster image based on the information acquired in step S6004 to generate a print image, and stores the generated print image in the storage unit 5003. In the present exemplary embodiment, as illustrated in FIG. 4, a print image with a white void at a center thereof is formed based on the information indicating the perfect binding setting, the gluing white-void region size information L3001, and the raster image.

In step S6006, the control unit 5001 forms an image on a sheet based on the print image.

In step S6007, in a case where the control unit 5001 determines that a read image is received from the controller 1360 of the image reading apparatus 1300 (YES in step S6007), the processing proceeds to step S6008. In a case where the control unit 5001 determines that a read image is not received from the controller 1360 of the image reading apparatus 1300 (NO in step S6007), the processing in step S6007 is repeated.

In step S6101, the control unit 5101 of the image reading apparatus 1300 starts the processing.

In step S6102, in a case where the control unit 5101 determines that a read image is acquired (YES in step S6102), the processing proceeds to step S6103. In a case where the control unit 5101 determines that a read image is not acquired (NO in step S6102), the processing in step S6102 is repeated.

In step S6103, the control unit 5101 transmits the acquired read image to the controller 1160. Then the processing proceeds to step S6104. In step S6104, the processing ends.

In step S6008, the control unit 5001 stores the received read image in the storage unit 5003. Coordinates of interest on the raster image are assumed to be coordinates (A, B). The control unit 5001 initializes the variables A and B to −M and −N, respectively. The variables A and B are used internally to compare the raster image and the read image.

In step S6009, the control unit 5001 determines whether a pixel of interest is an inspection target pixel.

Whether a pixel of interest is an inspection target pixel is based on whether the pixel is in a region where a difference occurs between the raster image and the print image. In the present exemplary embodiment, pixels in the gluing whitevoid region 3001 are excluded from the inspection target. Whether the coordinates (A, B) satisfy the condition of $-L \leq A \leq L$ and $-N \leq B \leq N$ is determined. In a case where the condition is not satisfied, i.e., a pixel of interest is an inspection target pixel (YES in step S6009), the processing proceeds to step S6010. In a case where the condition is satisfied, i.e., a pixel of interest is not an inspection target pixel (NO in step S6009), the processing proceeds to step S6011. This condition can be set in a case where glue binding is set as the print setting information.

A case where there is a plurality of glue binding machines can also be handled. The print setting information may include not only a setting indicating whether glue binding is set but also model names of the glue binding machines. In a case where glue binding is set for another model type, whether the condition of $-L' \leq A \leq L'$ and $-N \leq B \leq N$ is satisfied can be determined. More specifically, the region to be excluded from the inspection target can be set for each model type of the plurality of glue binding machines. Further, applications to settings other than the glue binding setting are also possible. Assume that the print setting information specifies a subsequent printing target, such as a header, a footer, or a stamp, and a position thereof. In this case, the position of information to be printed subsequently based on the print setting information and a range corresponding to the neighborhood of the position can be calculated. For example, in a case where a header is set to be printed at coordinates (C, D), the range of coordinates to be excluded from the inspection target can be calculated based on the coordinates (C, D) and the size of the subsequent printing target.

In step S6010, the control unit 5001 calculates a difference between a pixel at the coordinates (A, B) of the raster image and a pixel at the coordinates (A, B) of the read image and determines whether the difference is greater than a preset threshold value. In a case where the difference is greater than the preset threshold value (YES in step S6010), the processing proceeds to step S6015. In a case where the difference is not greater than the preset threshold value (NO in step S6010), the processing proceeds to step S6011.

In the pixel comparison method, information about neighboring pixels of the comparison target pixels can be weighted and added. The pixel comparison method is not limited thereto, and various modifications and changes can be made. In the present exemplary embodiment, the raster image and the read image can be compared by comparing object positions using edge detection or by comparing results of character recognition processing (optical character recognition (OCR)). The image comparison method is also not limited thereto, and various modifications and changes can be made.

In step S6011, the control unit 5001 increments the variable A by one so that the processing is performed on the next pixel.

In step S6012, the control unit 5001 determines whether the condition of A>M is satisfied. In a case where the control unit 5001 determines that the condition of A>M is satisfied (YES in step S6012), the processing proceeds to step S6013. In a case where the control unit 5001 determines that the condition of A>M is not satisfied (NO in step S6012), the processing proceeds to step S6014.

In step S6013, the control unit 5001 assigns −M to the variable A and increments the variable B by one in order to inspect a pixel of the next row in the Y-direction 3004.

In step S6014, the control unit 5001 determines whether the condition of B<N is satisfied. In a case where the control unit 5001 determines that the condition of B<N is satisfied (YES in step S6014), the processing proceeds to step S6009. In a case where the control unit 5001 determines that the condition of B<N is not satisfied (NO in step S6014), the control unit 5001 determines that all inspections are completed, and the processing proceeds to step S6016. In step S6016, the process ends.

In step S6015, the control unit 5001 provides an error notification indicating an error. The error notification is to notify a user or a maintenance operator that an error occurs, and can be in any notification forms. For example, a human voice notification may be provided. Alternatively, a notification using a pattern of combination of blinking and lighting of warning lamps of one or more colors can be provided. For example, the notification can be displayed on a display panel (not illustrated) of the image forming apparatus body 1100. Further, a sheet discharge destination for print sheets without an error and a sheet discharge destination for print sheets with an error can be made different from each other. While the gluing white-void region 3001 in perfect binding has been described as an example in the present exemplary embodiment, the region to be excluded from the comparison target is not limited thereto. For example, a region where a difference occurs between the raster image and the print image, such as a region where a page number is added, may be excluded from the comparison target.

For example, in a case where the print setting information specifies placement of a page number at pixels located in a predetermined range, the pixels located in the predetermined range can be excluded from an error detection range or an error notification range.

As described above, even in a case where the print data input by the user changes due to the internal processing of the image forming apparatus 1000, the region to be inspected can be inspected properly by excluding the region where the change occurs from the inspection target.

Those described above in the present exemplary embodiment will be repeatedly described now. A raster image is generated based on processing such as PDL processing. The generated raster image is stored in the storage unit 5003. The control unit 5001 has been described above as an example of an image forming unit that forms a print image (an image for printing) based on the raster image and the print setting information. The image forming unit 1130 prints an image on a recording medium based on the print image formed by the control unit 5001. Examples of the recording medium include paper and plastic films.

Further, the image printed by the image forming unit 1130 is read. This is performed by the image reading unit 1340. A read image obtained by reading the image on the recording medium by the image reading unit 1340 is stored. In other words, the read image is obtained by reading the image printed on the recording medium.

Whether there is an error in the image printed on the recording medium is determined based on the read image and the raster image. Processing for the determination is performed by the control unit 5001.

Further, in a case where there is a difference between the raster image and the read image and the difference originates from the print setting information, the control unit 5001 does not determine that there is an error in the printed image. The print setting information is, for example, information indicating the perfect binding setting and the gluing white-void region size information L3001.

In addition, the control unit 5001 may be configured to not determine that there is an error in the printed image in a case where there is a difference between the raster image and the read image and the difference is associated with the glue binding setting.

In a case where the glue binding setting is set as the print setting information, a predetermined region corresponding to the glue binding setting can be processed as follows. The control unit 5001 excludes the predetermined region from an error determination target, so that the control unit 5001 does not determine that there is an error in the printed image.

Further, in a case where an instruction to form a predetermined character or a predetermined image at a predetermined position is set as the print setting information, a region corresponding to the predetermined position can be processed as follows. The control unit 5001 excludes the corresponding region from an error determination target, so that the control unit 5001 does not determine that there is an error in the printed image.

The glue binding apparatus 1400 has been described above as an example of a post-processing unit that performs glue binding of sheets with images printed thereon. The glue binding apparatus 1400 performs, as gluing processing, perfect binding to glue content sheets as a body and a cover sheet together (refer to FIGS. 2A to 2G).

Further, information about a region subject to the gluing processing may be included in the print setting information. The control unit 5001 can perform error determination processing differently on each of the region subject to the gluing processing and a region not subject to the gluing processing, based on the print setting information about the gluing processing.

Figure 7:
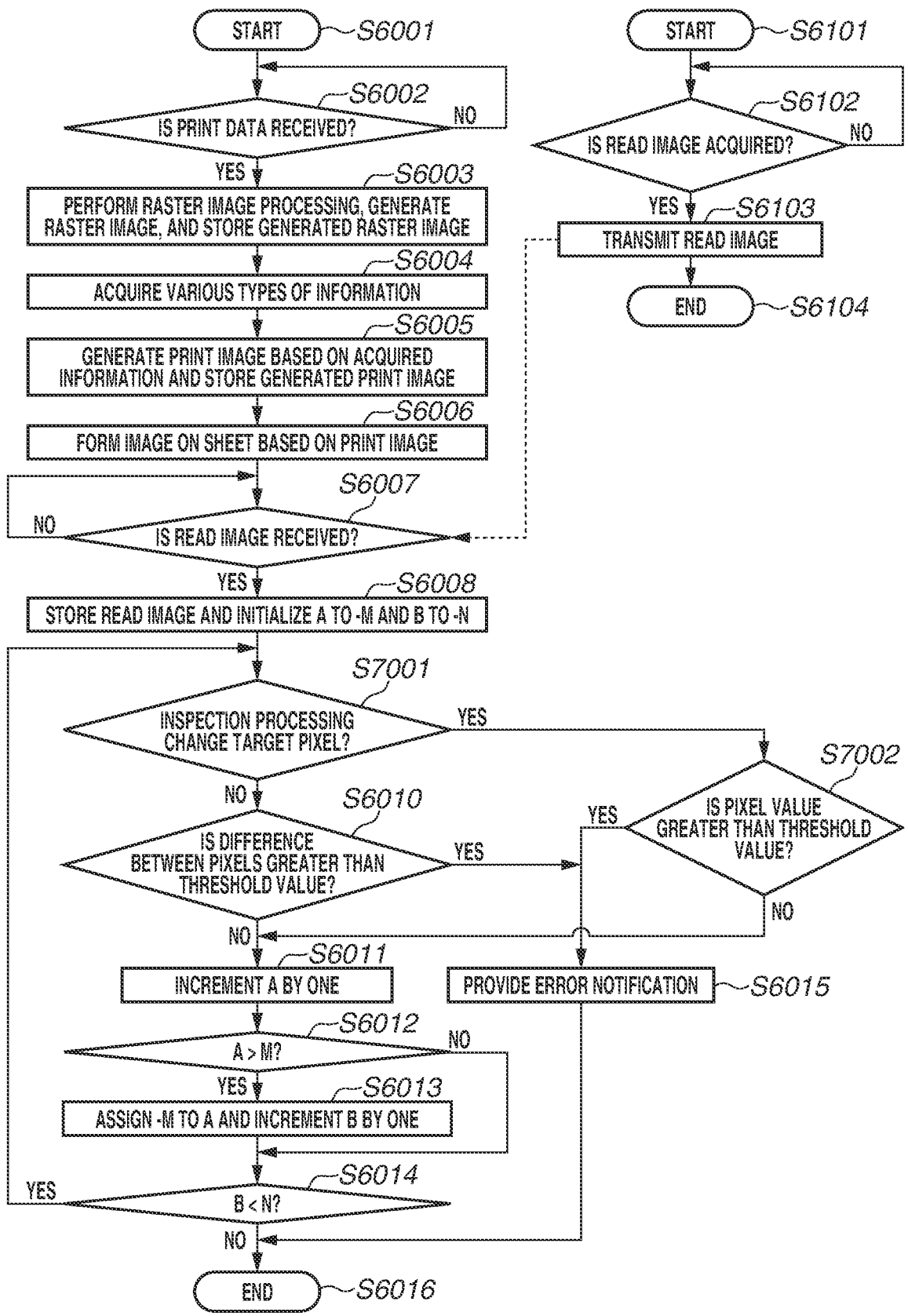
FIG. 7 is a flowchart illustrating a control procedure according to a second exemplary embodiment of the present invention.

A second exemplary embodiment will be described below. The control for comparing the raster image and the read image according to the first exemplary embodiment can be performed alternatively as follows. Details thereof will be described with reference to a flowchart illustrated in FIG. 7. The same or similar components are given the same reference numerals, and redundant descriptions thereof will be omitted. Differences from the first exemplary embodiment will be mainly described. Unless otherwise specified, portions not described below are basically the same as those in the first exemplary embodiment. Processing in steps S6001 to S6016, S7001, and S7002 in the flowchart is implemented by the control unit 5001, such as a CPU, reading a program stored in the memory 5002 and executing the read program. Processing in steps S6101 to S6104 in the flowchart is implemented by the control unit 5101, such as a CPU, reading a program stored in the memory 5102 and executing the read program.

In step S7001, the control unit 5001 determines whether a pixel of interest is an inspection processing change target pixel. Whether a pixel of interest is an inspection processing change target pixel is based on whether the pixel is in a region where a difference occurs between the raster image and the print image. In the present exemplary embodiment, the pixels in the gluing white-void region 3001 are inspection processing change target pixels. Thus, whether the condition of −L≤A≤L and −N≤B≤ N is satisfied is determined. In a case where the condition is satisfied (YES in step S7001), the processing proceeds to step S7002. In a case where the condition is not satisfied (NO in step S7001), the processing proceeds to step S6010.

In step S7002, the control unit 5001 determines whether an error occurs, based on whether the value of the pixel in the read image is greater than a preset threshold value. In the present exemplary embodiment, the pixels in the gluing white-void region 3001 are the inspection processing change target pixels, and thus whether a white void is properly formed can be determined by comparison with the preset threshold value. In a case where the pixel value is greater than the threshold value (YES in step S7002), the processing proceeds to step S6015. In a case where the pixel value is not greater than the threshold value (NO in step S7002), the processing proceeds to step S6011. While the gluing white-void region 3001 in perfect binding has been described as an example in the present exemplary embodiment, other comparison methods are also available. For example, in a case where the read image is rotated by 180 degrees with respect to the raster image, positive and negative signs of coordinates of corresponding positions on the images are reversed, and the resulting images are compared. Further, in a case where a central position on the read image is displaced with respect to a central position on the raster image, comparison target positions on the images can be adjusted so that the central positions are aligned. Methods for inspecting a region where a difference occurs between the raster image and the read image are not limited to thereto, and various modifications and changes can be made.

As described above, even in a case where the print data input by the user changes due to the internal processing of the image forming apparatus 1000, the finished quality of a printed material can be inspected properly by applying a different inspection method to the region where the change occurs.

A third exemplary embodiment will be described below. The control of the comparison target according to the first exemplary embodiment can be performed alternatively as follows.

Figure 8:
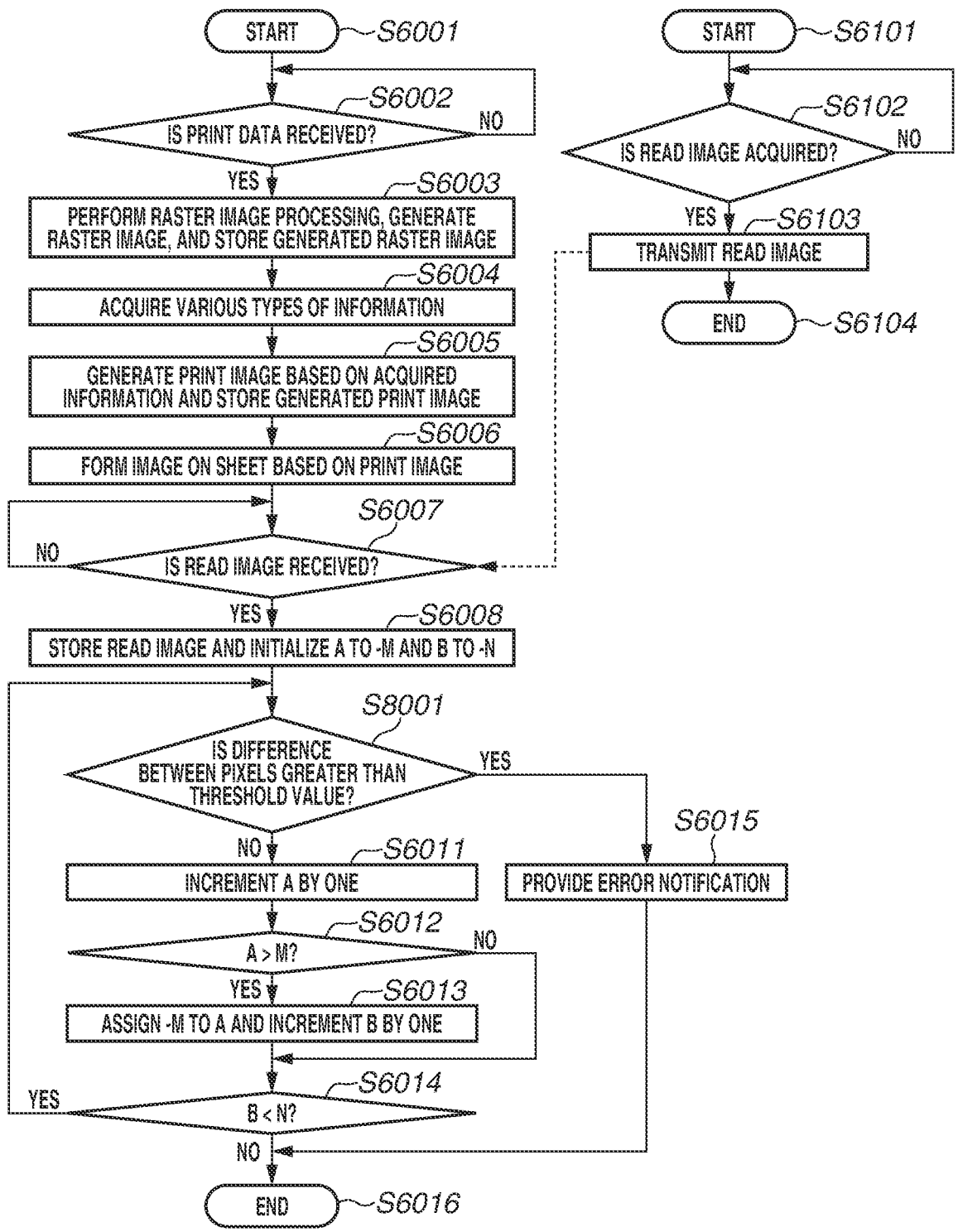
FIG. 8 is a flowchart illustrating a control procedure according to a third exemplary embodiment of the present invention.

Details thereof will be described with reference to a flowchart in FIG. 8. The same or similar components are given the same reference numerals, and redundant descriptions thereof will be omitted. Differences from the first exemplary embodiment will be mainly described. Processing in steps S6001 to S6016 and S8001 in the flowchart is implemented by the control unit 5001, such as a CPU, reading a program stored in the memory 5002 and executing the read program. Processing in steps S6101 to S6104 in the flowchart is implemented by the control unit 5101, such as a CPU, reading a program stored in the memory 5102 and executing the read program.

In step S8001, the control unit 5001 calculates a difference between the pixel at the coordinates (A, B) on the print image obtained in step S6005 and the pixel at the coordinates (A, B) on the read image.

More specifically, in step S6005, as described above, the print image where the center portion is whitened as illustrated in FIG. 4 is generated based on the information indicating the perfect binding setting, the gluing white-void region size information L3001, and the raster image. This print image and the read image are to be compared in step S8001. Then, whether the difference is greater than the preset threshold value is determined in step S8001. In a case where the difference is greater than the preset threshold value (YES in step S8001), the processing proceeds to step S6015. In a case where the difference is not greater than the preset threshold value (NO in step S8001), the processing proceeds to step S6011.

As described above, even in a case where the print data input by the user changes due to the internal processing of the image forming apparatus 1000, the finished quality of a printed material can be inspected properly by comparing the print image obtained through the internal processing of the image forming apparatus 1000 and the read image.

The processing in step S6005 has been described above as an example of processing for generating a print image from a rasterized raster image based on the print setting information. The print setting information is, for example, information indicating the perfect binding setting and the gluing white-void region size information L3001. The print image is, for example, a print image where the center portion is whitened as illustrated in FIG. 4. Further, the processing in step S6006 has been described as an example of processing for forming an image on a sheet based on the print image. An example of a configuration for reading the image formed on the sheet by this image forming processing is the image reading unit 1340.

The control unit 5001 determines whether there is an error in the image on the sheet, based on the read image obtained by reading the image on the sheet by the image reading unit 1340.

Further, as described above in the description of step S8001, in the determination processing, whether an error occurs is determined based on the print image and the read image. The processing is performed by the control unit 5001 as described above.

Modified Example

According to the first exemplary embodiment, the print image generation and the comparison processing are both performed by the control unit 5001. In a case where the print image generation and the comparison processing occur simultaneously, the comparison processing may be delayed depending on the processing speed of the control unit 5001, and this may cause a decrease in performance. Thus, in a modified example of the first exemplary embodiment, another inspection personal computer (inspection PC) for performing the comparison processing is prepared to perform the comparison processing. Details thereof will be described with reference to FIGS. 9 and 10. The same or similar components are given the same reference numerals, and redundant descriptions thereof will be omitted.

Figure 9:
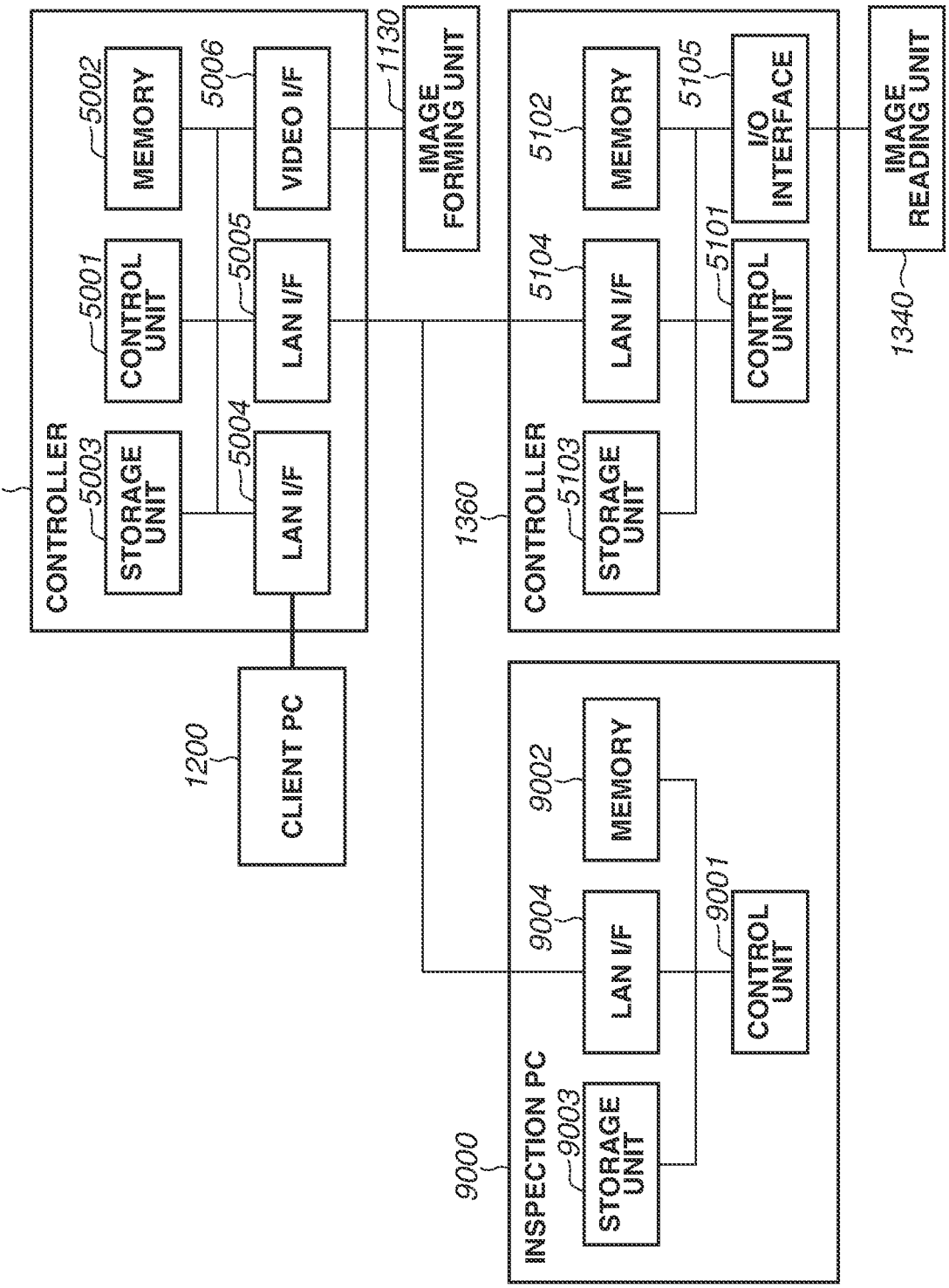
FIG. 9 is a block diagram illustrating a flow of various types of data according to a modified example of the first exemplary embodiment of the present invention.

FIG. 9 illustrates a control configuration for inspecting the finished quality of a printed material according to the present modified example. An inspection PC 9000 includes a control unit 9001, such as a CPU, and a memory 9002, such as a ROM or a RAM. The inspection PC 9000 further includes a storage unit 9003, such as a HDD, and a LAN I/F 9004 as a communication interface. The control unit 9001 reads a program corresponding to processing details from the memory 9002, executes the read program, and controls operations of the inspection PC 9000.

Various types of data stored in the storage unit 9003 are referred to when the control unit 9001 controls the operations of the inspection PC 9000.

The control unit 9001 inspects the finished quality of a printed material by acquiring the raster image from the controller 1160 and the read image from the controller 1360 via the LAN I/F 9004, comparing the raster image and the read image, and determining whether there is an error in the printed material. Details thereof will be described below.

Figure 10:
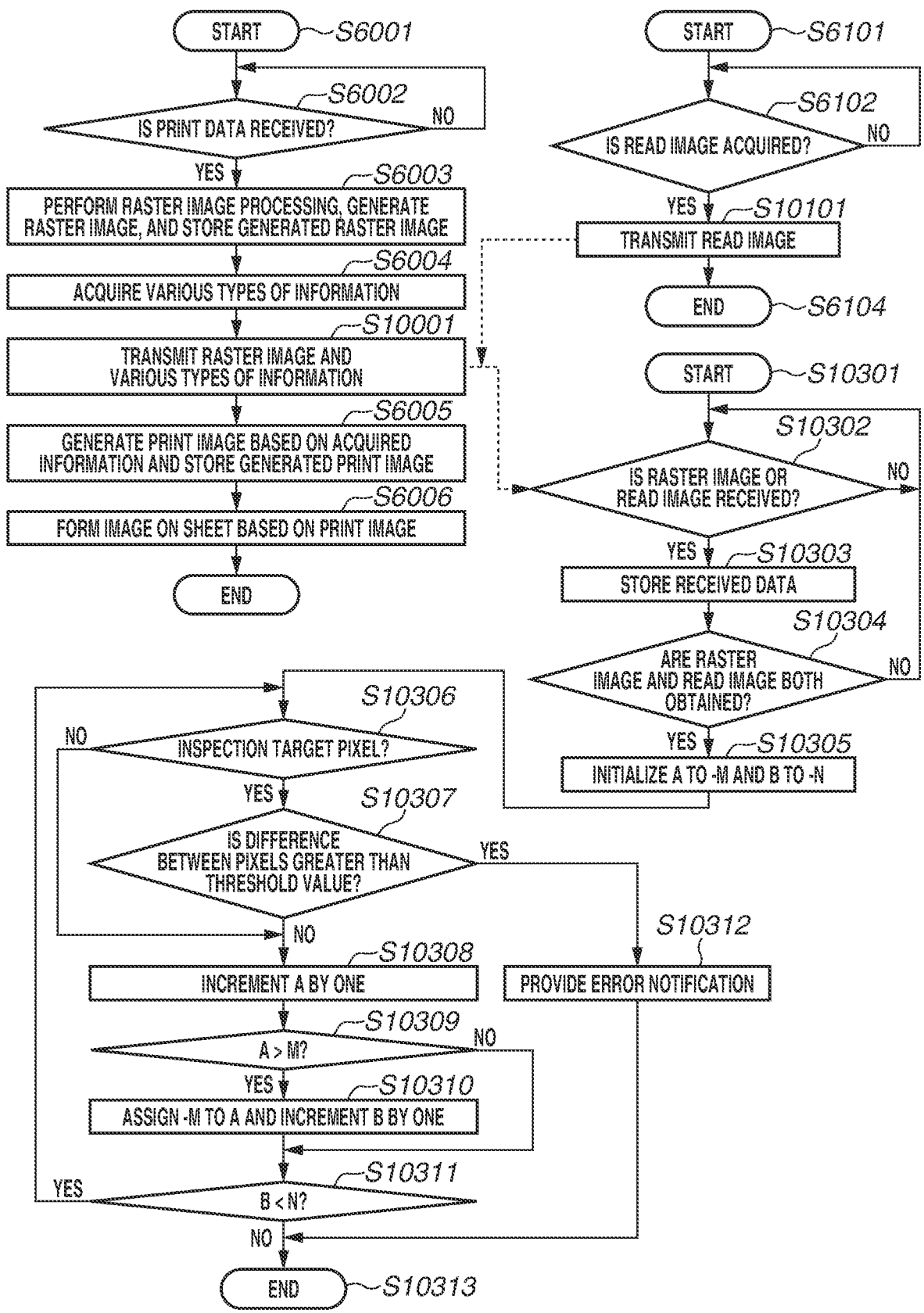
FIG. 10 is a flowchart illustrating a control procedure according to the modified example of the first exemplary embodiment of the present invention.

Next, a control procedure for inspecting the finished quality of a printed material according to the present modified example will be described with reference to a flowchart in FIG. 10. In the present modified example, a case where perfect binding is selected will be described as an example. Processing in step S10001 in the flowchart is implemented by the control unit 5001, such as a CPU, reading a program stored in the memory 5002 and executing the read program. Processing in step S10101 in the flowchart is implemented by the control unit 5101, such as a CPU, reading a program stored in the memory 5102 and executing the read program. Processing in steps S10301 to S10313 in the flowchart is implemented by the control unit 9001, such as a CPU, reading a program stored in the memory 9002 and executing the read program.

In step S10001, the control unit 5001 transmits the raster image and various types of information to the inspection PC 9000. In the present modified example, the various types of information are information indicating the perfect binding setting and the half L3005.

In step S10101, the control unit 5101 transmits the acquired read image to the inspection PC 9000.

In step S10301, the control unit 9001 of the inspection PC 9000 starts the processing.

In step S10302, in a case where the control unit 9001 receives the raster image or the read image (YES in step S10302), the processing proceeds to step S10303. In a case where the control unit 9001 receives neither the raster image nor the read image (NO in step S10302), the processing in step S10302 is repeated.

In step S10303, the control unit 9001 stores the received data in the storage unit 9003.

In step S10304, the control unit 9001 determines whether both the raster image and the read image are obtained. In a case where both the raster image and the read image are obtained (YES in step S10304), the processing proceeds to step S10305. In a case where both the raster image and the read image are not obtained (NO in step S10304), the processing returns to step S10302. In the present modified example, the comparison processing is performed on the raster image and the read image in the order of receipt. However, in a case where, for example, a single raster image is to be compared with a plurality of read images, an identifier (ID) for associating the raster image with each of the read images can be prepared to clarify the correspondence relationship.

In step S10305, the control unit 9001 initializes the variables A and B to $-M$ and $-N$, respectively. The variables A and B are used internally to compare the raster image and the read image.

In step S10306, the control unit 9001 determines whether a pixel of interest is an inspection target pixel. Whether a pixel of interest is an inspection target pixel is based on whether the pixel is in a region where a difference occurs between the raster image and the print image. In the present modified example, the pixels in the gluing white-void region 3001 are excluded from the inspection target. Thus, whether the condition of $-L \leq A \leq L$ and $-N \leq B \leq N$ is satisfied is determined. In a case where the condition is not satisfied, i.e., a pixel of interest is an inspection target pixel (YES in step S10306), the processing proceeds to step S10307. In a case where the condition is satisfied, i.e., a pixel of interest is not an inspection target pixel (NO in step S10306), the processing proceeds to step S10308.

In step S10307, the control unit 9001 calculates a difference between the pixel at the coordinates (A, B) on the raster image and the pixel at the coordinates (A, B) on the read image. Whether the difference is greater than a preset threshold value is determined. In a case where the difference is greater than the preset threshold value (YES in step S10307), the processing proceeds to step S10312. In a case where the difference is not greater than the preset threshold value (NO in step S10307), the processing proceeds to step S10308. In the pixel comparison method, information about neighboring pixels of the comparison target pixels can be weighted and added. The pixel comparison method is not limited thereto, and various modifications and changes can be made. In the present modified example, the raster image and the read image can be compared by comparing object positions using edge detection or by comparing results of the character recognition processing (OCR). The image comparison method is also not limited thereto, and various modifications and changes can be made.

In step S10308, the control unit 9001 increments the variable A by one so that the processing is performed on the next pixel.

In step S10309, the control unit 9001 determines whether the condition of A>M is satisfied. In a case where the control unit 9001 determines that the condition of A>M is satisfied (YES in step S10309), the processing proceeds to step S10310. In a case where the control unit 5001 determines that the relation of A>M is not satisfied (NO in step S10309), the processing proceeds to step S10311.

In step S10310, the control unit 9001 assigns $-M$ to the variable A and increments the variable B by one in order to inspect a pixel of the next row in the Y-direction 3004.

In step S10311, the control unit 9001 determines whether the condition of B<N is satisfied. In a case where the control unit 9001 determines that the condition of B<N is satisfied (YES in step S10311), the processing proceeds to step S10306. In a case where the control unit 9001 determines that the condition of B<N is not satisfied (NO in step S10311), the control unit 9001 determines that all inspections are completed and the processing proceeds to step S10313. In step S10313, the processing ends.

In step S10312, the control unit 9001 provides an error notification indicating an error. The error notification is to notify the user or the maintenance operator that an error occurs, and can be in any notification forms. For example, the notification can be displayed on the display panel (not illustrated) of the image forming apparatus body 1100. Further, a sheet discharge destination for print sheets without an error and a sheet discharge destination for print sheets with an error can be made different from each other. While the gluing white-void region 3001 in perfect binding has been described as an example in the present modified example, the region to be excluded from the comparison target is not limited thereto. For example, a region where a difference occurs between the raster image and the print image, such as a region where a page number is added, can be excluded from the comparison target. The comparison processing for the inspection according to the present modified example is similar to that according to the first exemplary embodiment. Alternatively, for example, the inspection PC 9000 may perform the method for changing the inspection processing as in the second exemplary embodiment. Further alternatively, the inspection PC 9000 may perform the method for performing the comparison processing on the print image and the read image as in the third exemplary embodiment.

As described above, the inspection PC 9000 compares the raster image and the print image, so that the finished quality of a printed material is inspected properly without causing a decrease in performance. An image forming system according to an exemplary embodiment of the present invention is a system for use in image formation, and an example thereof is the system illustrated in FIG. 1.

According to an aspect of an exemplary embodiment of the present invention, a system capable of inspecting the finished quality of a printed material properly is provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming system comprising:
a printer;
a reader; and
one or more controllers including one or more processors and one or more memories, wherein the one or more controllers are configured to perform operations including:
performing binding image processing on an image to generate a print image;
enabling the printer to print the generated print image on a recording medium;
enabling the reader to read the image printed on the recording medium by the printer to obtain a read image;
binding of the recording medium on which the image is printed; and
determining whether there is a defect in the image printed on the recording medium based on a reference image,
wherein the determining determines whether, in the read image, there is a defect in a region other than a region where the binding image processing is performed, and
wherein the determining includes determining whether a difference between a pixel at a position of the reference image and a pixel at a position of the read image is greater than a predetermined threshold value, the position of the read image being in the region other than the region where the binding image processing is performed and corresponding to the position of the reference image.

2. The image forming system according to claim 1, wherein in a case where there is a defect and a difference originates from a glue binding setting, the determining does not determine that there is a defect in the printed image.

3. The image forming system according to claim 1, wherein the determining does not determine that there is a defect in the printed image by excluding, from a defect determination target, a predetermined region corresponding to a glue binding setting.

4. The image forming system according to claim 1, wherein in a case where an instruction to form a predetermined character or a predetermined image at a predetermined position is set as the print setting information, the determining does not determine that there is a defect in the printed image by excluding, from a defect determination target, a region corresponding to the predetermined position.

5. The image forming system according to claim 1, wherein the one or more controllers are further configured to perform operations including:
post-processing comprising performing glue binding of the recording medium on which the image is printed, wherein the post-processing includes perfect binding that glues content sheets and a cover sheet together as gluing processing, the content sheets being a body,
wherein information about a region subject to the gluing processing is included in the print setting information, and
wherein the determining performs defect determination processing differently on each of the region subject to the gluing processing and a region not subject to the gluing processing.

6. A method for controlling an image forming system, the method comprising:
performing binding image processing on an image to generate a print image;
printing the generated print image on a recording medium;
reading the image printed on the recording medium to obtain a read image;
binding of the recording medium on which the image is printed; and
determining whether there is a defect in the image printed on the recording medium based on a reference image,
wherein the determining determines whether, in the read image, there is a defect in a region other than a region where the binding image processing is performed, and wherein the determining includes determining whether a difference between a pixel at a position of the reference image and a pixel at a position of the read image is greater than a predetermined threshold value, the position of the read image being in the region other than the region where the binding image processing is performed and corresponding to the position of the reference image.

7. The method according to claim 6, wherein in a case where there is a defect and a difference originates from a glue binding setting, the determining does not determine that there is a defect in the printed image.

8. The method according to claim 6, wherein the determining does not determine that there is a defect in the printed image by excluding, from a defect determination target, a predetermined region corresponding to a glue binding setting set as the print setting information.

9. The method according to claim 6, wherein in a case where an instruction to form a predetermined character or a predetermined image at a predetermined position is set as the print setting information, the determining does not determine that there is a defect in the printed image by excluding, from a defect determination target, a region corresponding to the predetermined position.

10. The method according to claim 6, further comprising post-processing that performs glue binding of the recording medium on which the image is printed,
wherein the post-processing includes perfect binding that glues content sheets and a cover sheet together as gluing processing, the content sheets being a body,
wherein information about a region subject to the gluing processing is included in the print setting information, and
wherein the determining performs defect determination processing differently on each of the region subject to the gluing processing and a region not subject to the gluing processing, based on the print setting information.

* * * * *